United States Patent
Togami et al.

(10) Patent No.: US 11,152,775 B2
(45) Date of Patent: Oct. 19, 2021

(54) DIGITAL RELAY

(71) Applicant: Mitsubishi Electric Corporation, Tokyo (JP)

(72) Inventors: Mamoru Togami, Tokyo (JP); Toshihiko Miyauchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 16/490,933

(22) PCT Filed: May 16, 2017

(86) PCT No.: PCT/JP2017/018282
§ 371 (c)(1),
(2) Date: Sep. 4, 2019

(87) PCT Pub. No.: WO2018/211577
PCT Pub. Date: Nov. 22, 2018

(65) Prior Publication Data
US 2020/0067299 A1   Feb. 27, 2020

(51) Int. Cl.
*H02H 9/02* (2006.01)
*H02H 1/00* (2006.01)
(Continued)

(52) U.S. Cl.
CPC ........ *H02H 1/0092* (2013.01); *H02H 1/0007* (2013.01); *H02H 3/04* (2013.01); *H02H 3/08* (2013.01)

(58) Field of Classification Search
CPC .......... H02H 3/04; H02H 3/08; H02H 1/0007; H02H 1/0092
(Continued)

(56) References Cited

U.S. PATENT DOCUMENTS 5,994,790 A    11/1999  Nagashima et al.
6,678,136 B2 *  1/2004  Maeda .................. H02H 3/006
                                                                 361/78
2013/0082627 A1  4/2013  Ichikawa et al.

FOREIGN PATENT DOCUMENTS

JP    H0321939 U    3/1991
JP    H1020000 A    1/1998
(Continued)

OTHER PUBLICATIONS

International Search Report (with English translation) and Written Opinion issued in corresponding International Patent Application No. PCT/JP2017/018282, 8 pages (dated Jun. 13, 2017).
(Continued)

*Primary Examiner* — Jared Fureman
*Assistant Examiner* — Lucy M Thomas
(74) *Attorney, Agent, or Firm* — Buchanan Ingersoll & Rooney PC

(57) ABSTRACT

The invention includes an output circuit that outputs an operation signal to a direct current breaker that interrupts a direct current main circuit, and a processor that samples, at predetermined time intervals, digital data wherein a value detected by a direct current transformer that detects a current of the direct current main circuit is measured as an input current, calculates a computed measurement value to be output to a display circuit, and outputs control information for executing a protection process using measurement value sampling data obtained by the sampling to the output circuit, and executes a protection process of the direct current main circuit at every sampling.

4 Claims, 2 Drawing Sheets

(51) Int. Cl.
*H02H 3/04* (2006.01)
*H02H 3/08* (2006.01)

(58) Field of Classification Search
USPC .......................................................... 361/93.2
See application file for complete search history.

(56) References Cited

FOREIGN PATENT DOCUMENTS

| | | |
|---|---|---|
| JP | H10282159 A | 10/1998 |
| JP | 2002098728 A | 4/2002 |
| JP | 2004248477 A | 9/2004 |
| JP | 2010190645 A | 9/2010 |
| JP | 2013081285 A | 5/2013 |

OTHER PUBLICATIONS

Notice of Reasons for Refusal (with English translation) issued in corresponding Japanese Patent Application No. 2017-539045, 6 pages (dated Sep. 5, 2017).

\* cited by examiner

DIGITAL RELAY

TECHNICAL FIELD

The present invention relates to a digital relay, and in particular, relates to a digital relay that, in addition to carrying out a high speed protection process, executes a measuring process concurrently with a normal protection process and a high speed protection process.

BACKGROUND ART

In general, a digital relay has a measurement function for monitoring current, voltage, power, or the like, of a power system, and a protection function, that is, a function of outputting a control signal to a switching device such as a breaker, when a measurement value abnormality is detected.

To date, a digital protection relay including analog-to-digital conversion means that takes in analog signals from a power system, and converts the analog signals into digital data by sequentially sampling in accordance with a sampling frequency, digital filtering means that executes a filtering operation process on the digital data at a frequency n times (n is an integer of 2 or greater) the sampling frequency, and protective operation means that executes a protective operation based on a result of a processing by the digital filtering means, and generates a protection signal for the power system, has been disclosed as the digital relay in, for example, JP-A-2004-248477 (Patent Document 1).

CITATION LIST

Patent Literature

Patent Document 1: JP-A-2004-248477 (claim 1)

SUMMARY OF INVENTION

Technical Problem

The technology disclosed in Patent Document 1 is such that a measured value of current or the like is sampled at predetermined time intervals, thereby acquiring sampling data wherein the sampling is converted into digital data, a protection process is executed using the sampling data every one cycle, which is a time needed for N samplings, and a measurement process is executed every M cycles. Because of this, a cycle in which a protection process is executed is one cycle, and a delay of a time equivalent to one cycle occurs in an output of a control signal for protection. Because of this, an output of a control signal for protection is delayed, and a switching operation of a switching device such as a breaker is delayed, because of which there is a possibility of damage increasing when an accident occurs, impeding equipment operation.

When protecting an alternating current power system, there is no problem because a speed of a protection process of the existing digital relay is within a specification for a high voltage power receiving overcurrent relay (JIS C 4602-1986, JEC2510-1989). When protecting a direct current power system, however, a switching device compatible with direct current, such as a direct current breaker, is used, and a breaking time of a direct current-compatible switching device is long compared with that for alternating current due to the properties of direct current. Because of this, there is a need to reduce the time of outputting a control signal from the digital relay to the switching device in order to interrupt current more safely. Because of this, there is a demand for outputting a control signal at high speed using an algorithm that can reduce the time needed for a protection process of a digital relay.

The invention, having been contrived based on the heretofore described demand, has an object of providing a digital relay that, in addition to carrying out a high speed protection process by executing a direct current power system protection process for every sampling, executes a measurement process concurrently with a normal protection process and a high speed protection process.

Solution to Problem

A digital relay according to the invention is a digital relay that protects a direct current power system, that includes a measurement circuit that measures, as an input current, a value detected by a current detecting device that detects a current flowing in the power system, and outputs the measured value as digital data, an output circuit that outputs an operation signal to a switching device that interrupts the power system, a display circuit that outputs a display signal to display means, and a processor that outputs a display signal to the display circuit based on the digital data, and outputs control information to the output circuit, wherein the processor samples the digital data at predetermined time intervals and, in addition to calculating a computed measurement value to be output to the display circuit, outputs control information for executing a protection process using measurement value sampling data obtained by the sampling to the output circuit, and executes a protection process of the power system at every sampling, and that is characterized in that the protection process is divided into a high speed protection process that needs high speed and a normal protection process that does not need high speed, and the high speed protection process is executed every one sampling, in addition to which the normal protection process is executed at a timing of one cycle in which N times' worth of sampling data are accumulated, with N as an integer of 2 or greater, and the computed measurement value is calculated at a timing at which M cycles elapse, with M as an integer of 2 or greater.

Advantageous Effects of Invention

According to the digital relay according to the invention, a protection process can be executed in a time of one sampling, in addition to which a protection process can be executed at high speed by a protection process and a measurement process being carried out concurrently, whereby a time needed for an output of a control signal to a switching device can be reduced. Because of this, speed of a direct current power system protection can be increased, because of which there is no longer an increase in damage when an accident occurs, and there is no longer an impediment to equipment operation.

DESCRIPTION OF EMBODIMENTS

Hereafter, a preferred embodiment of a digital relay according to the embodiment will be described, with reference to the drawings.

First Embodiment

Figure 1:
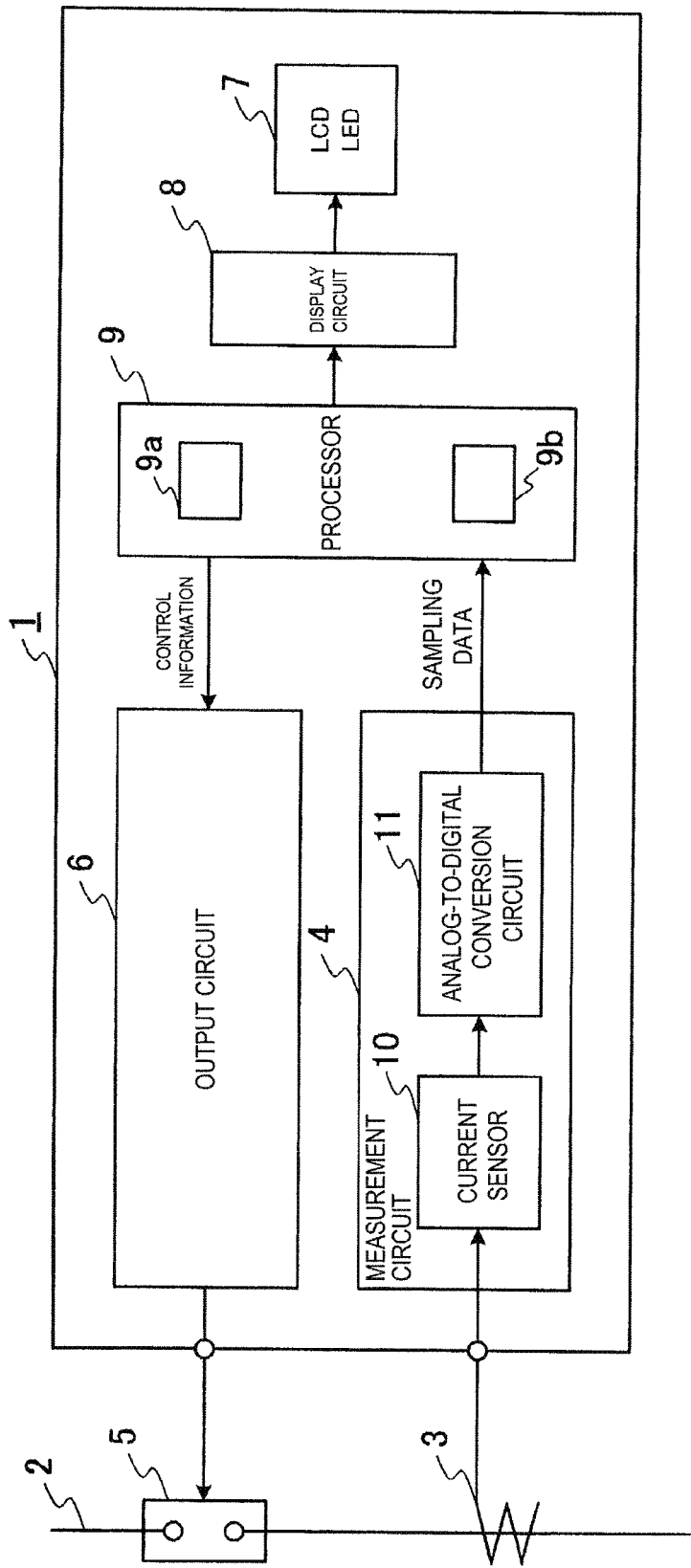
FIG. 1 is a functional configuration diagram of a direct current protection in which a digital relay according to a first embodiment of the invention is used.

FIG. 1 is a functional configuration diagram of a direct current protection in which a digital relay according to a first embodiment of the invention is used.

In FIG. 1, a digital relay 1 includes a measurement circuit 4 that measures, as an input current, a value detected by a direct current transformer 3, which is a current detecting device that detects current flowing in a direct current power system (hereafter called a direct current main circuit) 2, an output circuit 6 that outputs an operation signal to a direct current breaker 5, which is a switching device that interrupts the direct current main circuit 2, a display circuit 8 that outputs a display signal to display means 7 such as a liquid crystal display (LCD) or a light emitting diode (LED), and a processor 9 that has a computing unit 9a and a storage unit 9b, and executes a computing process and a control. Also, the measurement circuit 4 includes a current sensor 10 that measures an input current detected by the direct current transformer 3, and an analog-to-digital conversion circuit 11 that converts an analog value into a digital value.

Next, an operation of the digital relay 1 will be described. The measurement circuit 4 configuring the digital relay 1 measures a current value of the direct current main circuit 2 via the direct current transformer 3. The measurement circuit 4 acquires the current value of the direct current main circuit 2 using the current sensor 10, converts the current value into digital data in the analog-to-digital conversion circuit 11, and transfers the digital data to the processor 9. The processor 9 stores the digital data received from the analog-to-digital conversion circuit 11 in the storage unit 9b, samples this measurement value acquisition process at predetermined time intervals in the computing unit 9a, as will be described hereafter, and outputs control information for executing a protection process using measurement value sampling data to the output circuit 6. The output circuit 6 outputs an operation signal to the direct current breaker 5 based on the control information. As protection processes carried out by the processor 9, there is a protection process for which high speed is required, such as an overcurrent protection or an overvoltage protection (hereafter called a high speed protection process), and a protection process for which high speed is not required, such as an undercurrent protection or a leakage current protection (hereafter called a normal protection process).

Also, on acquiring measurement value digital data, the processor 9 executes a measurement process computation in the computing unit 9a, and calculates a computed measurement value such as a power value, a power amount value, or an average measurement value, using an acquired current value or voltage value. When acquiring information on the computed measurement value, the display circuit 8 outputs the computed measurement value as a signal to the LCD or LED 7, and the LCD or LED 7 outputs the measurement value as visual information. In this way, the processor 9 executes concurrent measurement and protection processes.

Figure 2:
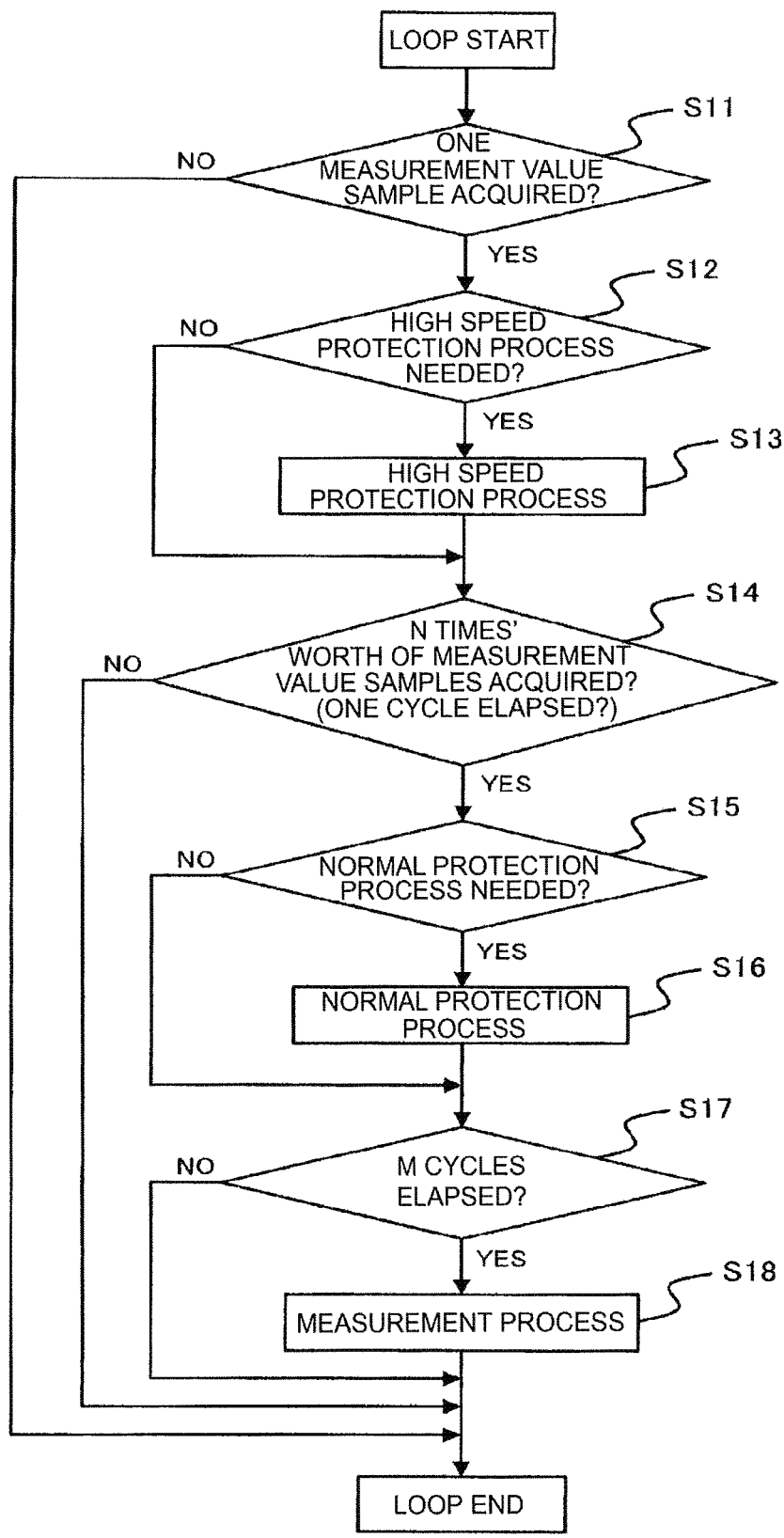
FIG. 2 is a diagram showing an algorithm of measurement and protection processes of the digital relay according to the first embodiment of the invention.

Next, concurrent measurement and protection processes executed by the processor 9 will be described in detail. FIG. 2 is a diagram showing an algorithm of measurement and protection processes of the digital relay 1, wherein the processes are executed by the computing unit 9a of the processor 9. When the digital relay 1 starts up normally, the algorithm of FIG. 2 repeatedly continues processing from "loop start" to "loop end".

In step S11 in FIG. 2, the processor 9 determines whether one sample of a measurement value has been acquired from the analog-to-digital conversion circuit 11 of the measurement circuit 4, shifts to step S12 and determines whether a high speed protection process is necessary when it is determined that one sample has been acquired, and ends the process when it is determined that no sample has been acquired.

When it is determined in step S12 that a high speed protection process is necessary, the processor 9 executes a high speed protection process in step S13, outputs control information to the output circuit 6, and shifts to step S14. When it is determined in step S12 that no high speed protection process is necessary, the processor 9 shifts to step S14 without executing a high speed protection process.

In step S14, the processor 9 determines whether N samples of a measurement value have been acquired, that is, whether one cycle has elapsed, shifts to step S15 and determines whether a normal protection process is necessary when it is determined that one cycle has elapsed, and ends the process when it is determined that one cycle has not elapsed. Herein, N indicates an integer of 2 or greater.

When it is determined in step S15 that a normal protection process is necessary, the processor 9 executes a normal protection process in step S16, and shifts to step S17. When it is determined in step S15 that no normal protection process is necessary, the processor 9 shifts to step S17 without executing a normal protection process.

In step S17, the processor 9 determines whether M cycles have elapsed, shifts to step S18, executes a measurement process, and ends the process when it is determined that M cycles have elapsed, and ends the process without executing a measurement process when it is determined that M cycles have not elapsed. Herein, M indicates an integer of 2 or greater.

As heretofore described, the digital relay 1 divides a protection process into a high speed protection process that needs high speed, such as for leakage current, and a normal protection process that does not need high speed, such as for undercurrent, and with regard to protection that needs high speed, executes a high speed protection process every one sampling. Further, with regard to protection that does not need high speed, the digital relay 1 executes a normal protection process at a timing of one cycle in which N times' worth of sampling data are accumulated. Also, with regard to measurement, the digital relay 1 executes a measurement process for calculating a measurement value at a timing at which M cycles elapse.

The digital relay 1 according to the first embodiment is such that high speed protection is realized at every one sampling by a high speed protection process and a normal protection process being executed concurrently with a measurement process, as heretofore described, in addition to which processing of an electronic instrument is basically such that processes executed in a time such as every one sampling or every M cycles are divided, rather than being concluded in one loop, whereby time taken for one loop is reduced. Measurement processes are also divided, because of which a processing capacity of one loop can be restricted, and compression of a processing capacity of the processor 9 due to a measurement process can be prevented, whereby a protection process and a measurement process can be executed stably.

Also, to date, a protection process has been executed every one cycle, which is the time needed for N samplings, as previously described, but as direct current has no voltage fluctuation, there is no need to sample an alternating current cycle, and a protection process can, in principle, be executed with only one sampling, because of which the digital relay 1 according to the first embodiment executes a protection process in one sampling cycles for direct current protection. Because of this, time needed for an output of a control signal to the direct current breaker 5 is reduced, and speed of protecting the direct current main circuit 2 can be increased. Consequently, there is no increase in damage when an accident occurs, and there is no impediment to equipment operation.

REFERENCE SIGNS LIST

1 digital relay, 2 direct current main circuit, 3 direct current transformer, 4 measurement circuit, 5 direct current breaker, 6 output circuit, 7 LCD or LED, 8 display circuit, 9 processor, 9a computing unit, 9b storage unit, 10 current sensor, 11 analog-to-digital conversion circuit.

The invention claimed is:

1. A digital relay that protects a direct current power system, the digital relay comprising:
   a measurement circuit that measures, as an input current, a value detected by a current detecting device that detects a current flowing in the power system, and outputs the measured value as digital data;
   an output circuit that outputs an operation signal to a switching device that interrupts the power system;
   a display circuit that outputs a display signal to display means; and
   a processor that outputs a display signal to the display circuit based on the digital data, and outputs control information to the output circuit, wherein
   the processor samples the digital data at predetermined time intervals and, in addition to performing a measurement process for output to the display circuit, outputs control information for executing a protection process using sampling data obtained by the sampling to the output circuit, and executes the protection process of the power system, and
   wherein the protection process comprises a high speed protection process that needs high speed and a normal protection process that does not need high speed, and the high speed protection process is executed every one sampling, in addition to which the normal protection process is executed at a timing of one cycle in which N times' worth of sampling data are accumulated, with N as an integer of 2 or greater, and the measurement process is performed only at a timing at which M cycles elapse, with M as an integer of 2 or greater.

2. The digital relay of claim 1, wherein a computed value as a result of the measurement process is a power value or an average measurement value.

3. The digital relay of claim 1, wherein the high speed protection process comprises an overcurrent protection process or an overvoltage protection process, and wherein the normal speed protection process comprises an undercurrent protection process or a leakage current protection process.

4. The digital relay of claim 1, wherein the normal protection process is executed at least partially concurrently with the measurement process.

* * * * *